Patented July 7, 1942

2,288,738

UNITED STATES PATENT OFFICE 2,288,738

TOXOID

Ivan A. Parfentjev, Nyack, N. Y.

No Drawing. Application October 26, 1939,
Serial No. 301,377

3 Claims. (Cl. 167—78)

This invention relates to the preparation of an immunizing antigen from a bacterial toxin and is particularly concerned with the production of a staphylococcus toxoid by peptic digestion.

In the production of toxoids, it is customary to detoxify the antigen by treatment of the antigen with formalin or the like. However, such products are prone to cause irritation when injected intradermally into man.

I have found that I may detoxify an antigen such as a bacterial toxin by digestion with pepsin to produce a toxoid that retains its antigenic activity but which has a greatly reduced content of irritating principle. This is especially applicable to the production of staphylococcus toxoid.

As a specific example of my process, I may prepare a staphylococcus toxin in the usual manner by growing staphylococcus in semi-solid agar. The agar and bacteria solution is removed by filtration and the filtrate preserved with a suitable material such as salicylic acid (½ gram to 11 liters). This filtrate solution is digested with pepsin by adding purified pepsin thereto in the proportion of 6 grams per liter of filtrate and then acidifying the solution to pH 4.6. This mixture is kept in an incubator at about 37° C. for fourteen to sixteen hours during which the desired digestion takes place. At the end of that period, the digestive process is checked by adding an alkali to bring the pH to about 7.0. This digestion converts the toxin to toxoid and otherwise modifies the composition so that the toxoid no longer causes necrosis or hemolysis. However, it still reacts with antitoxin to cause toxin-antitoxin flocculation to about 75% of the original activity.

The toxoid solution may be further purified by adding to it solid ammonium sulfate in an amount sufficient to make a 50% saturated solution. This causes a precipitation of the toxoid while products of digestion contained in the broth remain dissolved in the liquid. The precipitate containing the toxoid is separated from the liquid by filtration and the filtrate may be discarded. The toxoid is dissolved, preferably by dialysis, and is best further purified by an absorption process utilizing finely divided tricalcium phosphate as described in my Patent No. 2,123,198. This phosphate absorption removes all traces of pepsin residue and any other unnecessary material not previously disposed of in the ammonium sulfate treatment.

This staphylococcus toxoid before or after the purification steps, may be injected intradermally into man in accordance with the usual practice. The toxoid has a higher degree of purity than could be obtained by the customary methods. In addition, my toxoids produce immunity with less reaction. In other words, my toxoid has been found to be very much less irritating per flocculating unit than a toxoid prepared from the same toxin by detoxification with formalin. The ratio of irritating principle in the two is such that my toxoid contains less than one fiftieth to one one-hundredth as much as the formalin detoxified toxoid, based on equal immunizing content. When the formalin detoxified toxoid is used for injection, it must be diluted about four hundred times in order to avoid too serious local and systemic reactions. My toxoid may be used without dilutions without causing any systemic reactions and without any more local reactions than the highly diluted formalin toxoid. Therefore, immunization with my toxoid is attained more quickly since larger doses are possible with less undesired reaction.

The local and systemic reactions are important factors in use of these toxoids and avoidance of such reactions is greatly desired. When using my toxoids, local reactions are almost invariably absent except in those persons who are especially sensitive. However, even with such persons, the slight local reaction quickly passes and my toxoid causes rapid and painless desensitization so that subsequent injections cause no undesirable reactions. With the formalin toxoid, the mentioned high dilutions are necessary to permit its use at all and even then local and sometimes systemic reactions result. The formalin toxoid will eventually bring about desensitization but only after long periods of time with a number of injections and considerable pain.

Another advantage of my toxoids lies in the fact that they can be used with strong preservatives such as phenols and the like and have thereby been found to be stable for over one and one-half years without loss of antigenicity. The formalin toxoid, on the other hand, is preserved only with difficulty using the milder preservatives, and even then deterioration is rapid, while the stronger preservatives such as phenol, destruction is almost immediate.

Other obvious changes may be adopted in carrying out my process without departing from the spirit and scope of the invention.

I claim:

1. The process which comprises mixing staphylococcus toxin with a small amount of pepsin, acidifying the mixture to pH 4.6, subjecting the mixture to a temperature of about 37° C. for fourteen to sixteen hours and then neutralizing the mixture.

2. The process which comprises mixing staphylococcus toxin with a small amount of pepsin, acidifying the mixture to pH 4.6, subjecting the mixture to a temperature of about 37° C. for fourteen to sixteen hours, neutralizing the toxoid solution so prepared, adding solid ammonium sulfate in an amount sufficient to make a 50% saturated solution whereby the toxoid is precipitated and the products of digestion remain dissolved in the solution, removing the precipitate and redissolving it and treating the last named solution with tricalcium phosphate to further purify the solution.

3. A staphylococcus toxoid prepared by peptic digestion of staphylococcus toxin according to the process of claim 1, the toxoid having associated with it not over $\frac{1}{50}$ the irritating principle per flocculating unit of a toxoid prepared from a similar toxin by detoxification with formalin.

IVAN A. PARFENTJEV.